US010609023B2

(12) United States Patent
Kim et al.

(10) Patent No.: US 10,609,023 B2
(45) Date of Patent: Mar. 31, 2020

(54) AUTHENTICATION METHOD AND APPARATUS USING BIOMETRIC INFORMATION AND CONTEXT INFORMATION

(71) Applicant: Samsung Electronics Co., Ltd., Suwon-si (KR)

(72) Inventors: Soenghun Kim, Suwon-si (KR); Joohyun Park, Seoul (KR); Heejeong Lee, Suwon-si (KR); Youmin Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 405 days.

(21) Appl. No.: 14/837,947

(22) Filed: Aug. 27, 2015

(65) Prior Publication Data

US 2016/0065572 A1 Mar. 3, 2016

(30) Foreign Application Priority Data

Aug. 29, 2014 (KR) ......................... 10-2014-0114194

(51) Int. Cl.
*H04L 29/06* (2006.01)

(52) U.S. Cl.
CPC ............................... *H04L 63/0861* (2013.01)

(58) Field of Classification Search
None
See application file for complete search history.

(56) References Cited

U.S. PATENT DOCUMENTS 5,650,785 A * 7/1997 Rodal ..................... G01S 19/34
342/352
8,453,222 B1 * 5/2013 Newstadt .............. H04L 63/105
726/4

(Continued)

FOREIGN PATENT DOCUMENTS

CN           101257385        9/2008

OTHER PUBLICATIONS

International Search Report dated Feb. 23, 2016 corresponding to International Application No. PCT/KR2015/008872.

(Continued)

*Primary Examiner* — Lynn D Feild
*Assistant Examiner* — Richard A McCoy
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A terminal is provided, which includes a sensing unit configured to collect authentication information; and a control unit configured to perform the authentication based on first authentication information and second authentication information, to control the sensing unit to collect third authentication information if it is determined that the authentication based on the first authentication information has succeeded and the authentication based on the second authentication information has failed, and to perform the (Continued)

authentication based on the third authentication information. Since the authentication is performed through a combination of biometric information and context information that are acquired from two or more terminals, reliability and security of the authentication can be heightened.

6 Claims, 9 Drawing Sheets

(56) References Cited

U.S. PATENT DOCUMENTS

| | | | | |
|---|---|---|---|---|
| 8,627,438 | B1* | 1/2014 | Bhimanaik | H04L 63/10 726/9 |
| 8,689,294 | B1* | 4/2014 | Thakur | H04L 63/08 713/182 |
| 9,286,899 | B1* | 3/2016 | Narayanan | G10L 17/24 |
| 9,928,839 | B1* | 3/2018 | Lester | G06F 21/32 704/246 |
| 2002/0196180 | A1* | 12/2002 | Chang | G01S 19/02 342/357.57 |
| 2004/0164848 | A1* | 8/2004 | Hwang | G06F 21/32 340/5.82 |
| 2005/0063522 | A1* | 3/2005 | Kim | H04M 1/271 379/88.02 |
| 2005/0086079 | A1* | 4/2005 | Graves | G06Q 50/22 705/2 |
| 2006/0041755 | A1* | 2/2006 | Pemmaraju | G06F 21/32 713/182 |
| 2006/0105744 | A1* | 5/2006 | Frank | G06F 21/33 455/411 |
| 2008/0098466 | A1 | 4/2008 | Yoshida et al. | |
| 2008/0172725 | A1 | 7/2008 | Fujii et al. | |
| 2009/0034521 | A1* | 2/2009 | Kato | G06F 21/31 370/389 |
| 2009/0113543 | A1* | 4/2009 | Adams | G06F 21/33 726/18 |
| 2009/0141944 | A1* | 6/2009 | Abe | G06K 9/00 382/115 |
| 2009/0157454 | A1* | 6/2009 | Carter | G06Q 10/0633 705/7.27 |
| 2009/0161921 | A1 | 6/2009 | Ohnishi | |
| 2009/0238418 | A1* | 9/2009 | Sato | G06K 9/00885 382/115 |
| 2009/0320538 | A1* | 12/2009 | Pellaton | G07C 9/00166 70/278.1 |
| 2010/0299716 | A1* | 11/2010 | Rouskov | G06F 21/42 726/1 |
| 2011/0173685 | A1* | 7/2011 | Chai | H04L 41/0806 726/6 |
| 2011/0289572 | A1 | 11/2011 | Skeel et al. | |
| 2012/0153028 | A1* | 6/2012 | Poznansky | G06Q 20/385 235/492 |
| 2012/0200457 | A1* | 8/2012 | Farrokhi | G01S 5/0036 342/357.29 |
| 2012/0204255 | A1* | 8/2012 | Park | G06F 21/44 726/18 |
| 2012/0284514 | A1* | 11/2012 | Lambert | H04L 9/0819 713/168 |
| 2013/0036305 | A1* | 2/2013 | Yadav | H04L 63/065 713/168 |
| 2013/0063581 | A1* | 3/2013 | Komatsu | G06K 9/00288 348/77 |
| 2013/0179681 | A1* | 7/2013 | Benson | G06Q 20/38215 713/155 |
| 2013/0185775 | A1 | 7/2013 | Dispensa | |
| 2013/0225129 | A1* | 8/2013 | Norbisrath | G06F 21/32 455/411 |
| 2013/0227651 | A1 | 8/2013 | Schultz et al. | |
| 2014/0004880 | A1* | 1/2014 | Shen | G01S 19/23 455/456.1 |
| 2014/0066019 | A1 | 3/2014 | Waters et al. | |
| 2014/0157381 | A1* | 6/2014 | Disraeli | G06F 21/31 726/7 |
| 2014/0237591 | A1* | 8/2014 | Niemela | H04L 63/0853 726/22 |
| 2014/0368345 | A1* | 12/2014 | Dobbins | G08B 13/02 340/568.7 |
| 2015/0028996 | A1* | 1/2015 | Agrafioti | G06F 21/40 340/5.82 |
| 2015/0089585 | A1* | 3/2015 | Novack | H04L 63/08 726/3 |
| 2016/0007158 | A1* | 1/2016 | Venkatraman | H04W 4/023 455/456.2 |
| 2016/0050217 | A1* | 2/2016 | Mare | H04L 9/3215 726/4 |
| 2016/0189529 | A1* | 6/2016 | Lee | G08B 25/008 340/541 |
| 2017/0171189 | A1* | 6/2017 | Byszio | H04L 63/0815 |

OTHER PUBLICATIONS

Chinese Office Action dated Sep. 4, 2019 issued in counterpart application No. 201510543118.3, 11 pages.

\* cited by examiner

AUTHENTICATION METHOD AND APPARATUS USING BIOMETRIC INFORMATION AND CONTEXT INFORMATION

RELATED APPLICATION

This application claims the benefit under 35 U.S.C. § 119(a) of a Korean patent application filed on Aug. 29, 2014, in the Korean Intellectual Property Office and assigned Serial No. 10-2014-0114194, the entire disclosure of which is hereby incorporated by reference.

BACKGROUND

The present disclosure relates to an authentication method and apparatus using biometric information and context information, and more particularly to an authentication method and apparatus using biometric information and context information, which can perform authentication through a mix of the biometric information and the context information that is collected from two or more terminals.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the increase of smart phone functions, the use of authentication using a smart phone has also increased. For example, authentication may be required for mobile payment using a smart phone or reading information on a smart phone. Conventional authentication, such as an authenticated certificate, requires a user to directly input a password and a pattern.

SUMMARY

Since a smart phone includes various sensors and input devices, it is possible to acquire biometric information (e.g., fingerprint) using the sensors and the input devices to perform authentication based on the acquired biometric information. Although the biometric information is information inherent to a user, it is not impossible to copy the biometric information, and thus, a person who is not a legal user may perform the authentication through an illegal use of the biometric information. Accordingly, there has been a need for heightened reliability of authentication using biometric information.

In accordance with an aspect of the present disclosure, a method for performing authentication by a first terminal includes collecting first authentication information and second authentication information; performing the authentication based on the first authentication information and the second authentication information; and collecting the second authentication information in the case where the authentication based on the first authentication information has succeeded. The method may further include determining that the authentication based on the second authentication information has failed; collecting third authentication information; and performing the authentication based on the third authentication information.

In accordance with another aspect of the present disclosure, a method for performing authentication by a first terminal includes sensing first authentication information; receiving second authentication information that is sensed by a second terminal from the second terminal; determining whether the sensed first authentication information and the received second authentication information match each other; and determining that the authentication has successfully been performed. Success is determined if the sensed first authentication information and the received second authentication information match each other.

In accordance with another aspect of the present disclosure, a first terminal that performs authentication includes a sensing unit configured to collect authentication information; and a control unit configured to perform the authentication (based on first authentication information and second authentication information), to control the sensing unit to collect third authentication information (if it is determined that the authentication based on the first authentication information has succeeded and the authentication based on the second authentication information has failed), and to perform the authentication based on the third authentication information.

In accordance with another aspect of the present disclosure, a first terminal that performs authentication includes a sensing unit configured to collect authentication information; a communication unit configured to transmit and receive information to and from a second terminal; and a control unit configured to control the sensing unit to sense first authentication information, to control the communication unit to receive second authentication information that is sensed by the second terminal from the second terminal, and to determine that the authentication has successfully been performed (if it is determined that the sensed first authentication information and the received second authentication information match each other).

According to the aspects of the present disclosure, since the authentication is performed through a combination of the biometric information and the context information acquired from two or more independent terminals, reliability and security of the authentication can be heightened. If the authentication information is uncertain, the authentication procedure is not immediately ended, but an auxiliary authentication is performed using other authentication information to heighten user convenience.

DETAILED DESCRIPTION

Figure 1:
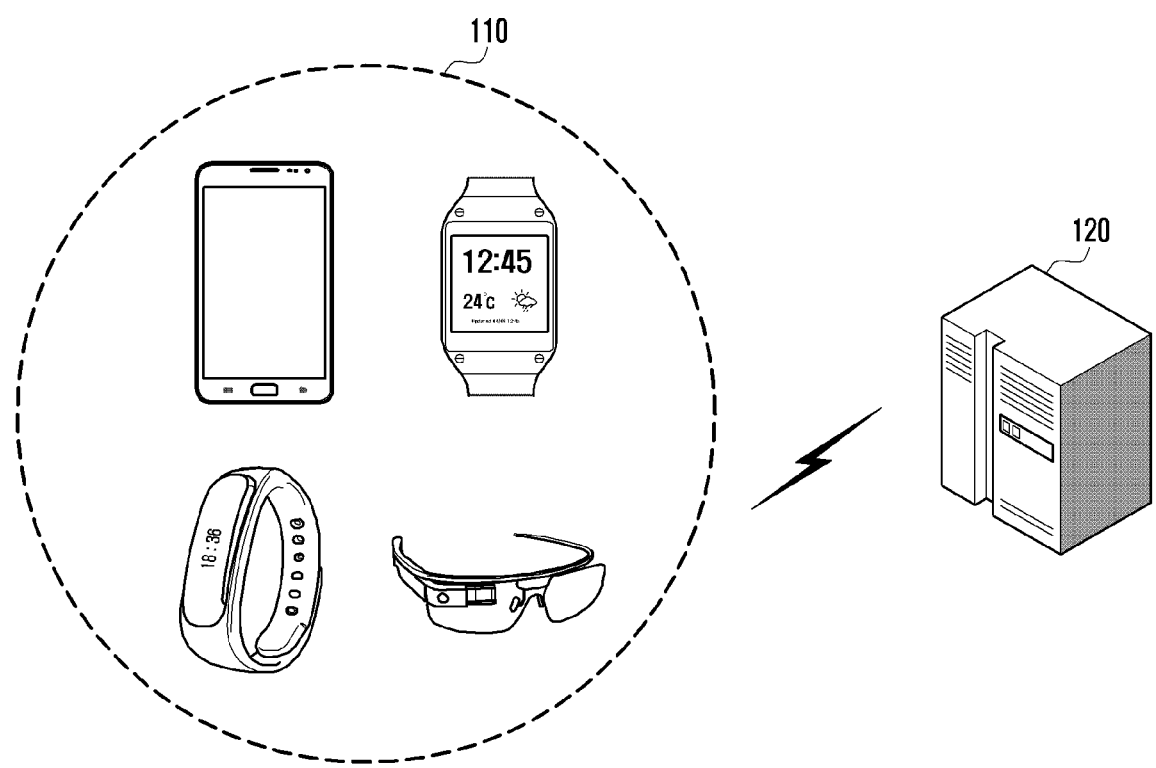
FIG. 1 illustrates the configuration of an authentication system that includes a terminal and an authentication server.

In the following description and claims of the present disclosure, the term "includes" and/or "comprises" means that other components or operations are not excluded in addition to the described components or operations. In the description and claims of the present disclosure, a singular expression may include a plural expression unless specially described. For example, the term "authentication information" may indicate one type of information or may include two or more pieces of information. Further, the term "image" may include one or more images or a moving image including one or more images. In the description and claims of the present disclosure, the suffix "unit" for each constituent element is given or used only in consideration of easy preparation of the description, but does not have any distinctive meaning or role for itself. In the description and claims of the present disclosure, the terms "first, second, and third" are used to discriminate between similar constituent elements, but are not used to describe them in consecutive order or in chronological order. Further, the term "first authentication information" or "first terminal" described in one embodiment may be the same as or may be different from that described in another embodiment. In the description and claims of the present disclosure, the term "collecting" includes the "sensing" of authentication information by a terminal itself and the "receiving" of authentication information that is transferred from another terminal, but is not limited thereto. For example, the terms "collecting" and "sensing" may be interchanged.

Hereinafter, various embodiments of the present disclosure will be described in detail with reference to the accompanying drawings. In the following description, only portions that are necessary to understand the operation according to various embodiments of the present disclosure will be explained, and explanation of other portions will be simplified or omitted to avoid obscuring the subject matter of the present disclosure. The features of the present disclosure are not limited to the above-described examples, but may include shape modifications or additional functions of the respective constituent elements to be described hereinafter. In the drawings, sizes and relative sizes of some constituent elements may be exaggerated for clarity in explanation.

FIG. 1 illustrates the configuration of an authentication system that includes a terminal and an authentication server.

Referring to FIG. 1, the system may include constituent elements of at least one terminal 110 and an authentication server 120.

The terminal 110 is a device that can communicate with another terminal or the authentication server 120 by wire or wirelessly and can collect authentication information. The authentication information includes biometric information and context information collected by the terminal 110 instantaneously or for a predetermined time. The terminal 110 may display information, such as an authentication information input request, authentication success, or authentication failure, through a display unit. The terminal 110 may include, for example, a tablet, a Personal Computer (PC), a Portable Multimedia Player (PMP), a Personal Digital Assistant (PDA), a smart phone, a smart device, a smart car, a portable phone, a headphone, an earphone, a digital photo frame, and a wearable device. The wearable device is an electronic device that can be worn on a human body, and is in the form of glasses, a watch, a bracelet, an anklet, a necklace, shoes, clothing, gloves, socks, a contact lens, a sport device, or a medical device to measure user biometric information and context information. Further, the wearable device may be attached to skin or may be transplanted in the human body. FIG. 1 illustrates a terminal 110 that is in the form of a phone, a watch, a band, or glasses.

The authentication server 120 is a device that stores information and functions required to perform authentication. If authentication information is received from at least one terminal 110, the authentication server 120 may perform the authentication using the information required to perform the authentication and stored therein. In the case of authentication for settlement, if the authentication is normally performed, the authentication server may notify a settlement server that the authentication has normally been performed or make the settlement by itself.

In a first embodiment of the present disclosure, if a user starts an authentication (or settlement) process, at least one terminal collects authentication information that is consciously provided by a user and authentication information that is unconsciously provided by a user at a predetermined time (e.g., at a moment when the authentication (or settlement) process starts), and if the unconsciously provided authentication information is unreliable, the terminal performs a supplementary procedure.

Figure 2:
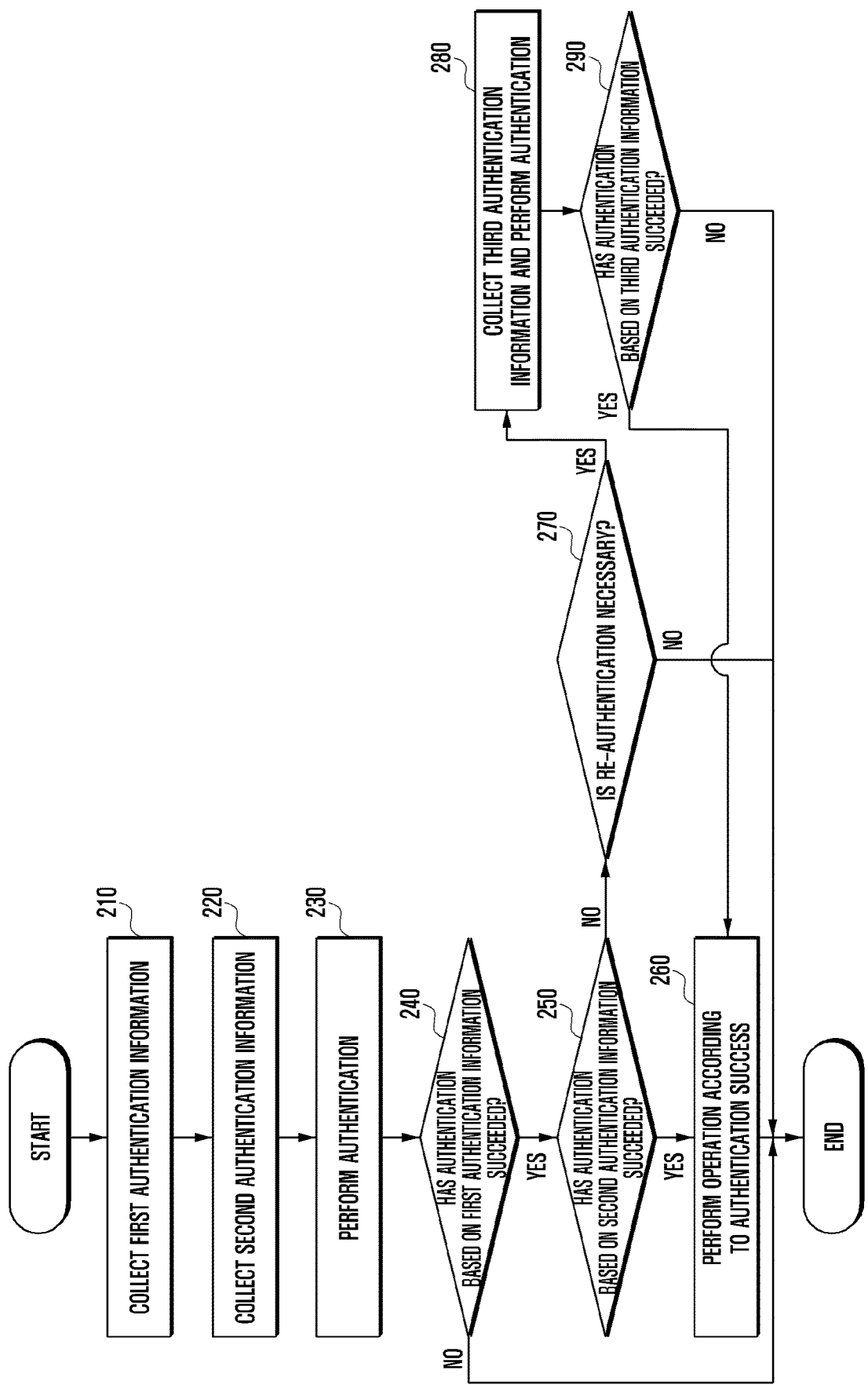
FIG. 2 illustrates an operation of a terminal according to a first embodiment of the present disclosure.

FIG. 2 illustrates an operation of a terminal according to a first embodiment of the present disclosure.

The terminal of the FIG. 2 may include terminal 110 of the FIG. 1. If a user authentication is requested, a terminal drives a biometric identification program, an application, or a graphic user interface (GUI). The biometric identification program, the application, or the graphic user interface (GUI) may be driven together when a settlement program is driven. If the biometric identification program, the application, or the graphic user interface (GUI) is driven, the terminal collects first authentication information at operation 210. The first authentication information may correspond to information to request a user's cooperation. The information to request a user's cooperation may include, for example, a user's fingerprint information, iris information, face outline information, blood information, saliva information, information that can be collected from a part of the user's body, such as a nail, a user's signature information, password information that a user inputs on the terminal, or information that is orally transferred by a user using a terminal through calling an operator of a call center.

Separately from the collection of the first authentication information, the terminal collects second authentication information at operation 220. The collection of the second authentication information may be performed by a separate terminal that is different from the terminal that collects the first authentication information. In the case where the second authentication information is collected by a separate terminal, the separate terminal may be requested by the terminal that collects the first authentication information to collect the second authentication information. When the collection request is received, or after a predetermined time elapses from the reception of the collection request, the separate terminal may collect the second authentication information, and may transfer the collected second authentication information to the terminal that collects the first authentication information. The second authentication information may correspond to information that does not require a user's cooperation. Information that does not require a user's cooperation may include, for example, current time information, information that can be measured from a user's exhalation, information that can be measured using a user's body fluid (e.g. tears), arterial heart rate information measured from the back of a user's hand, neck, arm, or leg, venous pattern information measured from the back of a user's hand, neck, arm, or leg, a user's voice information, operation information of a hand and an arm using electromyography, signature information pre-input by a user, or context information around a user. The current time information may be used to determine whether it is normal for a user to perform authentication at the current time. For example, if a user who gets up at 7:00 in the morning starts an authentication procedure for account transfer at 4:00 in the morning, it may be determined that the second authentication information (current time information) is unreliable. Context information may include image information acquired by a camera of a terminal, wireless LAN (WLAN) information, terminal location information acquired by a GPS (Global Positioning System), optical communication setting information, terminal location information acquired by optical communication, geomagnetic information, air temperature information, air pressure information, brightness information, moving speed information of a terminal, gravity information, or gas distribution information. The image information may correspond to, for example, one of a user's face, ear, operation (signature), work period, and a space to which a user belongs. The space to which a user belongs may correspond to, for example, one of a room, an office, classroom, bus, taxi, road, forest, and sea. The image information may be compared with pre-stored information in accordance with the kind of authentication, and then it may be determined whether the second authentication information is unreliable.

The collection of the first authentication information and the collection of the second authentication information may be triggered even without a user's input. In other words, the terminal may sense the situation in which the authentication is necessary by itself. A terminal may keep an initial condition to trigger the collection in a storage unit. The initial condition may be satisfied through a determination by a sensing unit or a communication unit included in the terminal. The initial condition may correspond to, for example, a case where the first terminal and the second terminal are connected to each other through near field communication, a case where the time set by a user arrives, a case where the terminal arrives at a place set by a user, a case where the terminal leaves a location set by a user, or a case where an incoming call is received.

In the description, information that requires a user's cooperation and information that does not require a user's cooperation are separately described. However, it is not necessary that the authentication information is included in one of the two pieces of information as described above, but according to embodiments, the authentication information may correspond to both of the two pieces of information. For example, although it is described that the user's saliva information is information that requires a user's cooperation, the user's saliva information may not require a user's cooperation if the sensor of the terminal is located in a place where the user's saliva can be taken.

The terminal, which has collected the first authentication information and the second authentication information, performs authentication at operation 230 using the collected first and second authentication information. The terminal may perform the authentication by itself, or may request the authentication server to perform the authentication. The authentication based on the first authentication information and the authentication based on the second authentication information may be separately performed, or the authentication based on the first authentication information may be performed before the second authentication information is collected.

At operation 240, it is determined whether the authentication based on the first authentication information has succeeded. The terminal may determine whether to succeed by itself or by receiving the result of the authentication performance from the authentication server. If the authentication based on the first authentication information succeeds, it is determined whether the authentication based on the second authentication information has succeeded at operation 250. If it is determined that the authentication based on the second authentication information has succeeded, the terminal performs an operation according to the success of the authentication at operation 260. The above-described operation may include settlement or may display specific information. On the other hand, if it is determined that the authentication based on the first authentication information has not succeeded at operation 240, the terminal ends the authentication procedure. In this case, authentication failure may be displayed on the display unit of the terminal. Unlike that as illustrated in FIG. 2, if the collected first authentication information has a value that is within a predetermined range and it is determined that the authentication based on the first authentication information has not succeeded at operation 240, re-collection of the first authentication information may be performed.

If it is determined that the authentication based on the second authentication information has failed at operation 250, it is then determined whether re-authentication is necessary at operation 270. Here, a case where the re-authentication is necessary may include a case where the result of the authentication performance is a result that is included in a predetermined range. The predetermined range may be set by a user, and in the case where the second authentication information has a measured value of a period or speed, the predetermined range may correspond to an error range. When the second authentication information includes an image, the predetermined range may correspond to a predetermined brightness, pattern, or color. If it is determined that re-authentication is necessary, third authentication information is collected at operation 280, and authentication is performed using the third authentication information. In the same manner as the first authentication information and the second authentication information, the authentication may be performed by the authentication server using the third authentication information. The third authentication information may correspond to authentication information not used as the first authentication information or the second authentication information. If the third authentication information is information that requires a user's cooperation, the terminal may request a user to input information for collection of the third authentication information. For example, the terminal may display a window for requesting an input through the display unit. The third authentication information may serve as a replacement or may supplement the second authentication information on which the authentication has not succeeded, and may correspond to information that requires a user's cooperation. If the third authentication information is information that does not require a user's cooperation, the terminal may directly collect the third authentication information without requesting a user to input information.

At operation 290, it is determined whether the authentication based on the third authentication information has succeeded. The terminal may determine whether to succeed by itself or by receiving the result of the authentication from the authentication server. If it is determined that the authentication based on the third authentication information has succeeded, the terminal performs an operation (e.g., settlement) according to the success of the authentication at operation 260. If it is determined that the authentication based on the third authentication information has not succeeded, the terminal ends the authentication procedure.

If it is determined that the authentication based on the first authentication information has failed at operation 240, the authentication procedure is ended. If it is determined that the authentication based on the first authentication information has failed, the first terminal may display an additional first authentication information request, and if the additional first authentication information is collected from a user, the first terminal may perform authentication based on the additional first authentication information. If the authentication based on the additional first authentication information has succeeded, the first terminal may proceed to operation 250. The additional first authentication information may correspond to authentication information not used as the first authentication information (e.g. information that requires a user's cooperation).

FIG. 2 illustrates operation 270 to determine whether re-authentication corresponding to the second authentication information is necessary. If the authentication based on the second authentication information failed, the third authentication information may be immediately collected without proceeding to operation 270, and the authentication based on the collected third authentication information may be performed.

FIG. 2 illustrates that the collection of the first authentication information (operation 210) is performed prior to the collection of the second authentication information (operation 220), but it is not limited thereto. For example, the collection of the second authentication information may be performed prior to the collection of the first authentication information, or the first authentication information and the second authentication information may be collected at the same time.

The operation according to the success of the authentication may include an operation that is customized by a user. For example, in the case where the first authentication information and the second authentication information are collected without a user's input and both the authentications have succeeded, an operation, such as an alarm generation, emergency call (call of a number preset by a user), text transmission, or record of a specific sentence in a notice board set by a user for a chat room.

Figure 3:
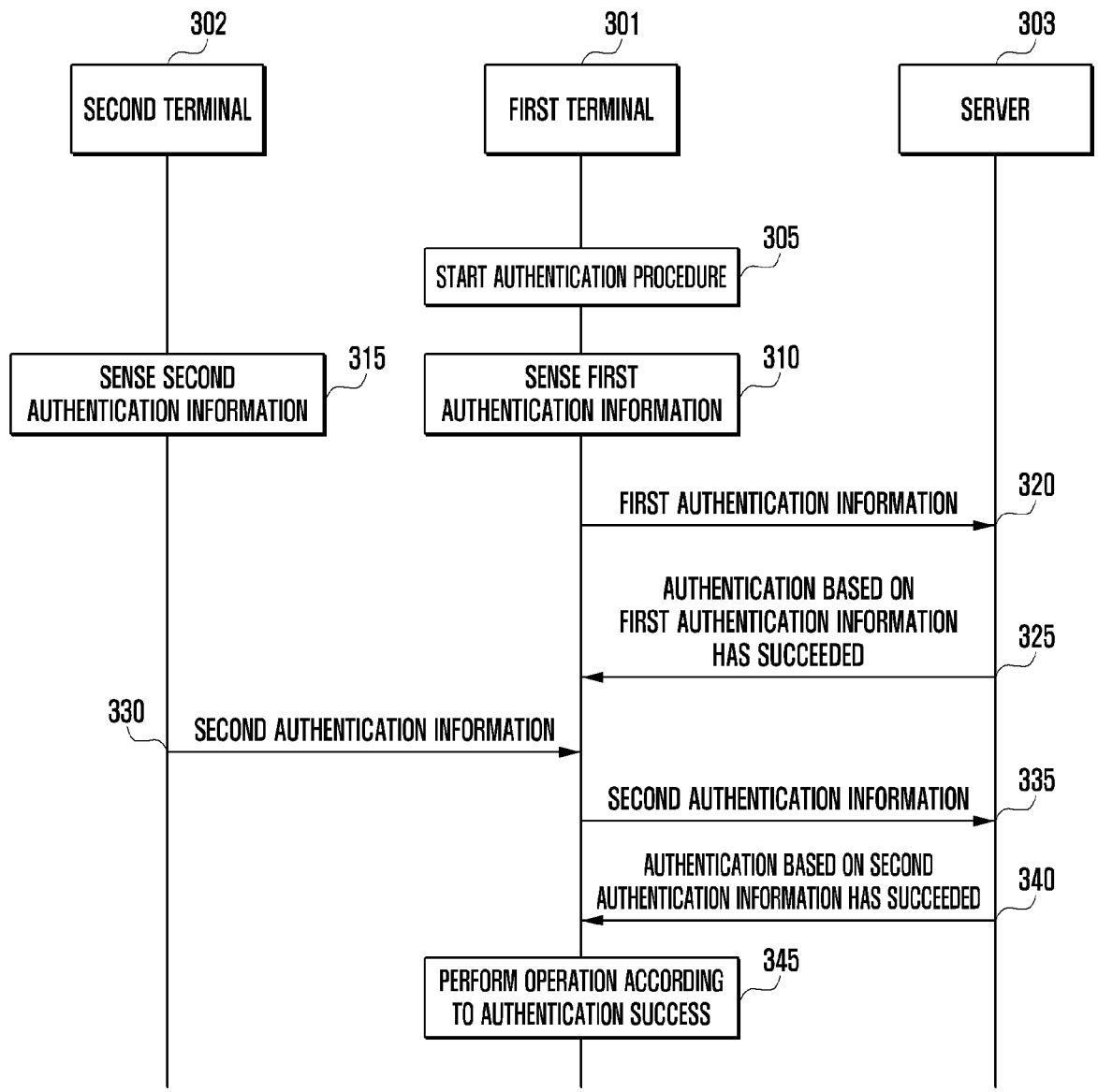
FIG. 3 illustrates an authentication procedure according to a first embodiment of the present disclosure.

FIG. 3 illustrates an authentication procedure according to a first embodiment of the present disclosure.

A first terminal 301 and a second terminal 302 correspond to one of the terminals 110 of FIG. 1, and are communicable with each other by wire or wirelessly. A server 303 may include the authentication server 120 of FIG. 1. Further, the server 303 may include an entity, such as an Evolved Node B (eNodeB) or MME (Mobility Management Entity).

At operation 305, the first terminal 301 starts an authentication procedure according to a user's input. The user's input may include launching a settlement program. With the start of the authentication procedure, the first terminal 301 senses first authentication information at operation 310, and the second terminal 302 senses second authentication information at operation 315. Although not illustrated in FIG. 3, the second terminal 302 may receive an authentication information request from the first terminal 301 before sensing the second authentication information. Although FIG. 3 illustrates that the different terminals collect the first authentication information and the second authentication information, respectively, one terminal (e.g., the first terminal 301) may be implemented to collect both the first authentication information and the second authentication information. Further, two or more terminals (e.g., the first terminal 301 and the second terminal 302) may be implemented to collect the same authentication information (e.g., the second authentication information). In this case, the authentication may be performed on the basis of the association of the authentication information collected by the respective terminals.

At operation 320, if the first authentication information that is collected by the first terminal 301 is transferred to the server 303, the server 303 performs the authentication based on the collected first authentication information. If the authentication based on the first authentication information has succeeded, the server 303 notifies the first terminal 301 that the authentication has succeeded at operation 325.

At operation 330, the second authentication information that is collected by the second terminal 302 is transferred to the first terminal 301. In this case, the transfer of the second authentication information may be performed by, for example, near field communication (e.g., Bluetooth, NFC, or tethering) or wired communication between the first terminal 301 and the second terminal 302. The transfer of the second authentication information, operation 330, may be performed prior to operation 320 or operation 325. At operation 335, the first terminal 301 transfers the second authentication information that was transferred from the second terminal 302 to the server 303. The server 303 performs the authentication based on the second authentication information. If the authentication based on the second authentication information has succeeded, the server 303 notifies the first terminal 301 that the authentication has succeeded at operation 340. Although FIG. 3 illustrates that the server 303 notifies the first terminal 301 that the authentication has succeeded at operation 340, the server 303 may be implemented to notify both the first terminal 301 and the second terminal 302 that the authentication has succeeded. Further, the second terminal 302 may be implemented to directly transfer the second authentication information to the server 303, rather than the second terminal 302 transferring the second authentication information to the first terminal 301, at operation 330.

Although FIG. 3 illustrates that the authentication is performed through the server 303, the terminals 301 and 302 may be implemented to perform the authentication by themselves. For example, if the first terminal 301 collects the first authentication information by itself, and the second terminal 302 collects the second authentication information and transfers the collected second authentication information to the first terminal 301, the first terminal 301 may perform the authentication based on the authentication information immediately when receiving the transferred second authentication information or after a predetermined time elapses.

If both the authentications based on the first authentication information and the authentication based on the second authentication information have succeeded, and operations 325 and 340 are performed, the first terminal 301 performs an operation according to the success of the authentication at operation 345. For example, the first terminal 301 may display the success of the authentication on the display unit. Further, the first terminal 301 may notify the second terminal 302 that the authentication has succeeded.

Figure 4:
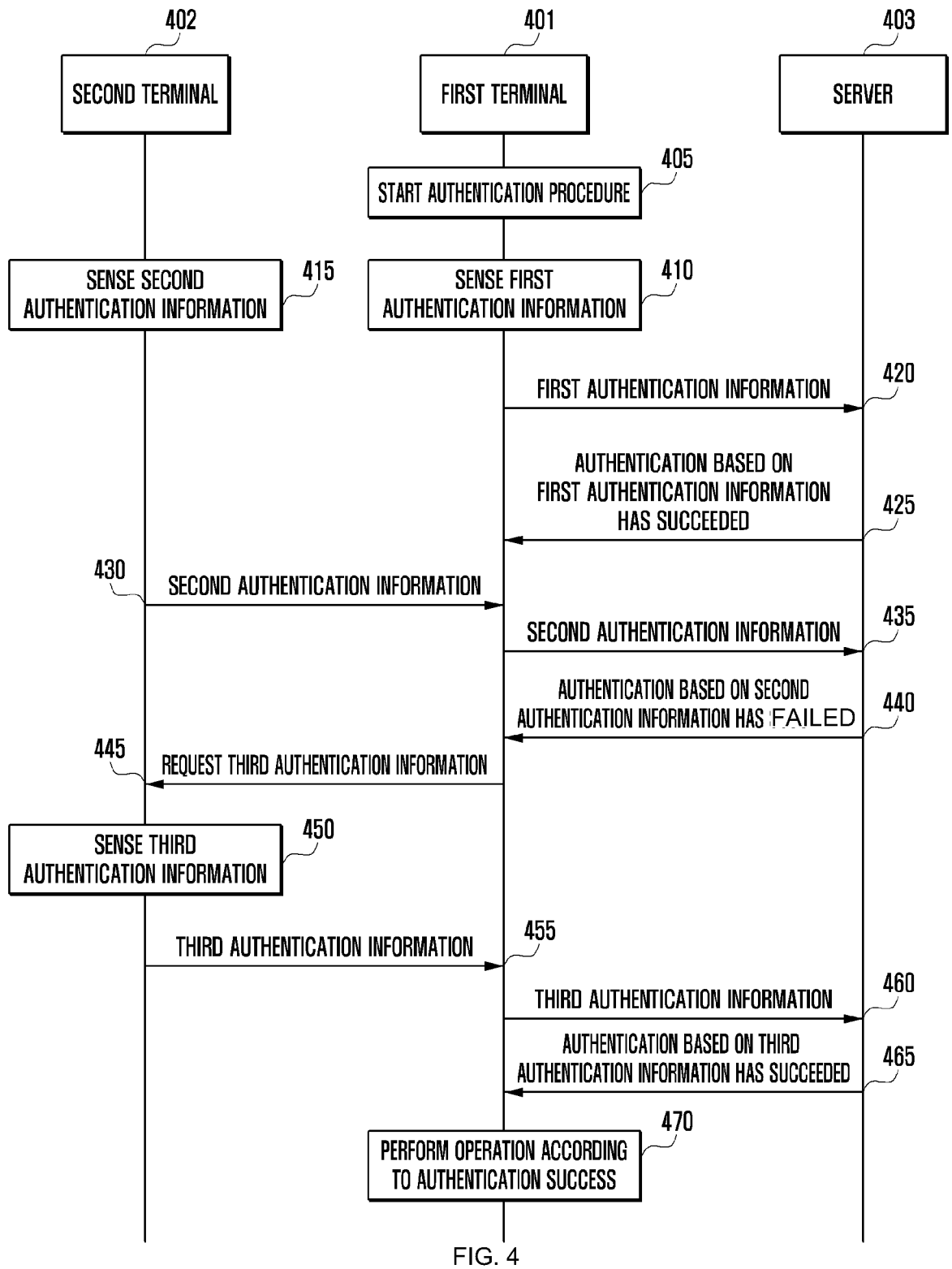
FIG. 4 illustrates an authentication procedure according to a first embodiment of the present disclosure.

FIG. 4 illustrates an authentication procedure according to a first embodiment of the present disclosure.

A first terminal 401, a second terminal 402, and a server 403 respectively correspond to the first terminal 301, the second terminal 302, and the server 303 of FIG. 3. Hereinafter, the same portions explained with reference to FIG. 3 will be omitted or simplified, and explanations will be made around the points different from those in FIG. 3. At operation 405, the first terminal 401 starts an authentication procedure according to a user's input. The first terminal 401 senses first authentication information at operation 410, and the second terminal 402 senses second authentication information at operation 415. At operation 420, if the first authentication information that was collected by the first terminal 401 is transferred to the server 403, the server 403 performs the authentication based on the collected first authentication information. If the authentication based on the first authentication information has succeeded, the server 403 notifies the first terminal 401 that the authentication has succeeded at operation 425.

At operation 430, the second authentication information that is collected by the second terminal 402 is transferred to the first terminal 401. At operation 435, if the first terminal 401 transfers the second authentication information that was transferred from the second terminal 402 to the server 403, the server 403 performs the authentication based on the second authentication information. Unlike FIG. 3, FIG. 4 shows that the server 403 may determine the authentication based on the second authentication information has failed. For example, in the case where the second authentication information is a user's facial information, it may be determined that the authentication has failed if it is determined that facial information pre-stored in the server 403 is different from the second authentication information. Further, in the case where the second authentication information includes a user's motion and a user's location, it may be determined that the authentication has failed if the operation does not match the pre-stored location in server 403. In order to determine whether to fail the authentication, the server 403 may match two or more pieces of authentication information and may pre-store the authentication information.

If it is determined that the authentication based on the second authentication information failed, the server 403 notifies the first terminal 401 that the authentication has failed at operation 440. If it is determined that re-authentication is necessary, the first terminal 401 that was notified that the authentication based on the second authentication information has failed, may request the second terminal 402 to transfer third authentication information at operation 445. Further, the first terminal may sense third authentication information by itself. Further, in order for both the first terminal 401 and the second terminal 402 to collect the third authentication information, the first terminal 401 may request the second terminal 402 to transfer the third authentication information, and may sense the third authentication information by itself.

At operation 450, the second terminal 402 that was requested to transfer the third authentication information senses the third authentication information. At operation 455, the second terminal 402 transfers the collected third authentication information to the first terminal 401. In this case, the transfer of the third authentication information may be performed by near field communication or wired communication between the first terminal 401 and the second terminal 402. At operation 460, if the first terminal 401 transfers the third authentication information that was transferred from the second terminal 402 or was sensed by the first terminal 401 by itself to the server 403, the server 403 performs the authentication based on the third authentication information. If the authentication based on the third authentication information has succeeded, the server 403 notifies the first terminal 401 that the authentication has succeeded at operation 465.

Although FIG. 4 illustrates that the authentication is performed through the server 403, the terminal may be implemented to perform the authentication by itself. For example, with respect to the first authentication information collected by the first terminal 401 itself and the second authentication information and the third authentication information collected by the second terminal 402, the first terminal 401 may perform the authentication based on the authentication information when collecting the authentication information or after a predetermined time elapses. If the authentication based on the third authentication information has succeeded, the first terminal 401 performs an operation according to the authentication success at operation 470.

FIG. 4 illustrates supplemental authentication in the case of using two pieces of authentication information, but the number of pieces of authentication information is not limited to two. For example, three terminals may collect authentication information, and if authentication for one of three pieces of authentication information collected as above has failed, the terminals may request supplemental authentication information.

In FIGS. 3 and 4, the first terminal, at least one of terminal 301 and terminal 401, may correspond to a smart phone that provides input convenience, and the second terminal, at least one of terminal 302 and terminal 402, may correspond to a wearable device that has a low risk of loss. In this case, even if a person has picked up or has stolen the first terminal (smart phone) and starts an authentication procedure without permission, the authentication procedure will not to succeed without authentication information collected from the second terminal (wearable device). Thus, a legal user of the first terminal can be prevented from suffering damage.

FIGS. 3 and 4 illustrate that the first terminal, at least one of terminal 301 and terminal 401, transfers the first authentication information and the second authentication information to the server, at least one of server 303 and server 403, and is notified whether the authentication has succeeded with respect to the authentication information. That is, FIGS. 3 and 4 illustrate that the authentication based on the first authentication information and the authentication based on the second authentication information are separated from each other, but are not limited thereto. Unlike this, the first terminal may generate combined authentication information through combining the first authentication information and the second authentication information, and then may transfer the combined authentication information to the server, at least one of server 303 and server 403. In this case, the server may notify the first terminal whether the authentication has succeeded with respect to the combined authentication information.

According to a second embodiment of the present disclosure, two terminals collect authentication information, and authentication is performed through a determination of the degree of overlap or the degree of relevance between two pieces of authentication information.

Figure 5:
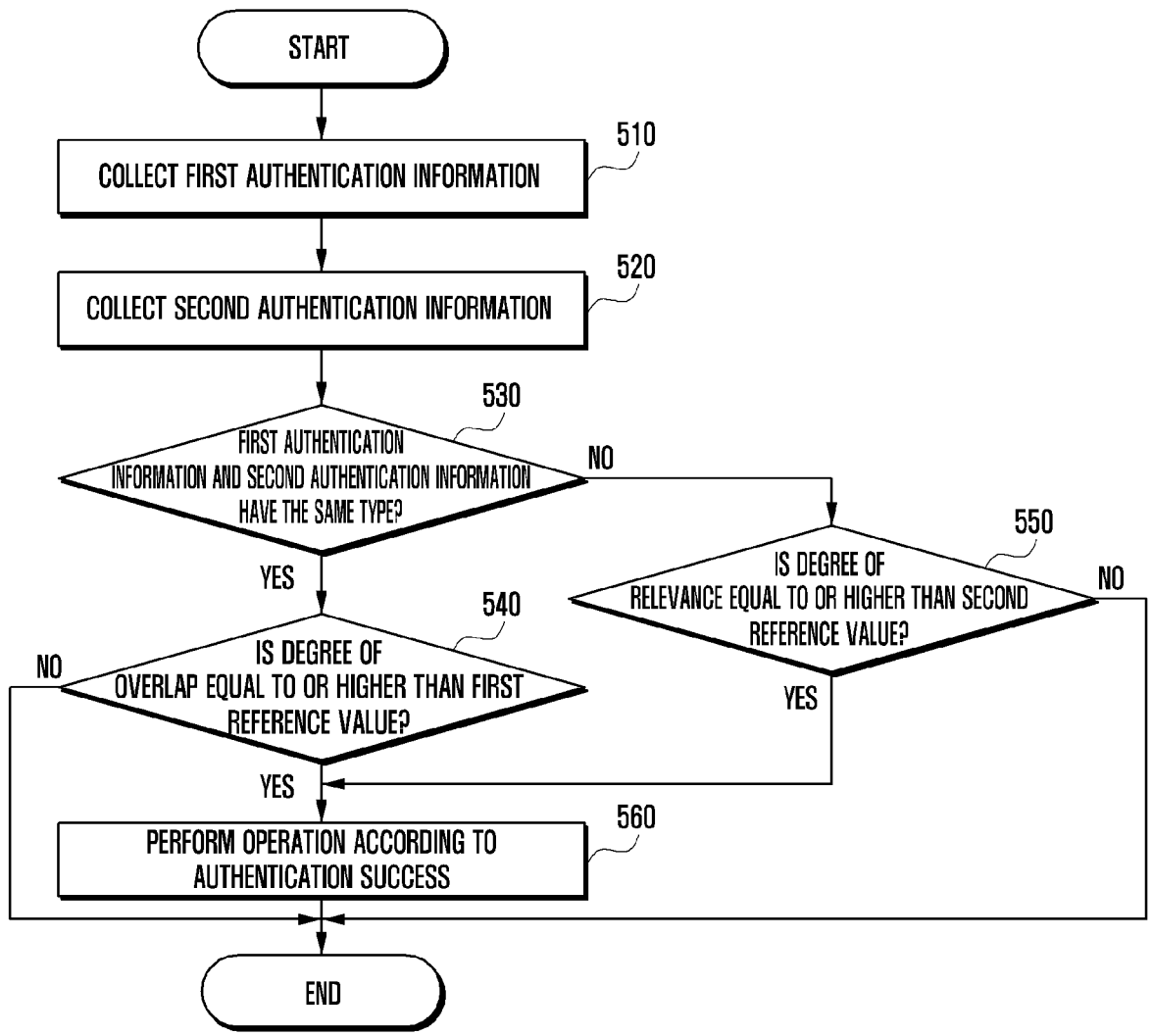
FIG. 5 illustrates an operation of a terminal according to a second embodiment of the present disclosure.

FIG. 5 illustrates an operation of a terminal according to a second embodiment of the present disclosure.

In explaining a second embodiment, portions that are the same as those according to the first embodiment will be simplified or omitted.

If a start of an authentication procedure is sensed, a first terminal collects first authentication information at operation 510. In the second embodiment, the authentication information may include information that requires a user's cooperation and information that does not require a user's cooperation in the first embodiment. Separately from the collection of the first authentication information, the first terminal requests a second terminal to collect second authentication information. Accordingly, at operation 520, the second terminal collects the second authentication information and transfers the second authentication information to the first terminal. The second authentication information may correspond to information having the same type as the type of the first authentication information or information having the different type from the type of the first authentication information. The collection of the first authentication information at operation 510 may be set to be the starting input of the authentication procedure. For example, if the first authentication information is collected by touching the first terminal with a part of a user's body for phone unlocking, the first terminal may request the second terminal to collect the second authentication information. The first terminal, that has collected the first authentication information and has received the second authentication information transferred thereto, determines whether the first authentication information and the second authentication information are information of the same type at operation 530. Unlike this, if the first terminal transfers the first authentication information and the second authentication information to the server, the server may determine whether the first authentication information and the second authentication information are information of the same type.

If it is determined that the first authentication information and the second authentication information are information of the same type, the first terminal determines whether a degree of overlap of the first authentication information and the second authentication information is equal to or higher than a first reference value at operation 540. For example, if the first authentication information and the second authentication information are both image information, it is determined whether a common portion between the first authentication information and the second authentication information is equal to or larger than a predetermined ratio. As another example, in the case where the first authentication information and the second authentication information are both audio information, it may be determined whether a common portion between the first authentication information and the second authentication information is equal to or larger than a predetermined ratio. As another example, in the case where the first authentication information and the second authentication information are both location information, it may be determined whether a location measured by the first terminal is equal to a location measured by the second terminal. As another example, in the case where the first authentication information and the second authentication information are both heart rate information collected for a predetermined time, it may be determined whether the periods in which heart rate patterns peak in the first authentication information and the second authentication information are equal to each other.

If it is determined that the first authentication information and the second authentication information are not information of the same type, the first terminal determines whether the degree of relevance between the first authentication information and the second authentication information is equal to or higher than a second reference value at operation 550. For example, in the case where the first authentication information is image information and the second authentication information is audio information, it may be determined whether the image information corresponds to the audio information. For example, in the case where the first authentication information is image information and the second authentication information is location information, it may be determined whether the image information corresponds to the location information. On the other hand, the authentication server may pre-store pairing information necessary to determine the degree of relevance.

On the other hand, in the case where the first terminal or the second terminal transfers the first authentication information and the second authentication information to a server, the server may proceed to operation 540 or operation 550, and may notify the first terminal of the result of the determination according to operation 540 or operation 550.

If it is determined that the degree of overlap is equal to or higher than the first reference value at operation 540 or the degree of relevance is equal to or higher than the second reference value at operation 550, the first terminal performs an operation according to the authentication success at operation 560.

If it is determined that the degree of overlap is lower than the first reference value at operation 540 or the degree of relevance is lower than the second reference value at operation 550, the first terminal ends the authentication procedure. Unlike this, if it is determined that the degree of overlap is lower than the first reference value at operation 540 or the degree of relevance is lower than the second reference value at operation 550, third authentication information and fourth authentication information, not used as the first authentication information and the second authentication information, may be collected from the first terminal and the second terminal, and the authentication procedure may re-proceed from operation 530.

Figure 6:
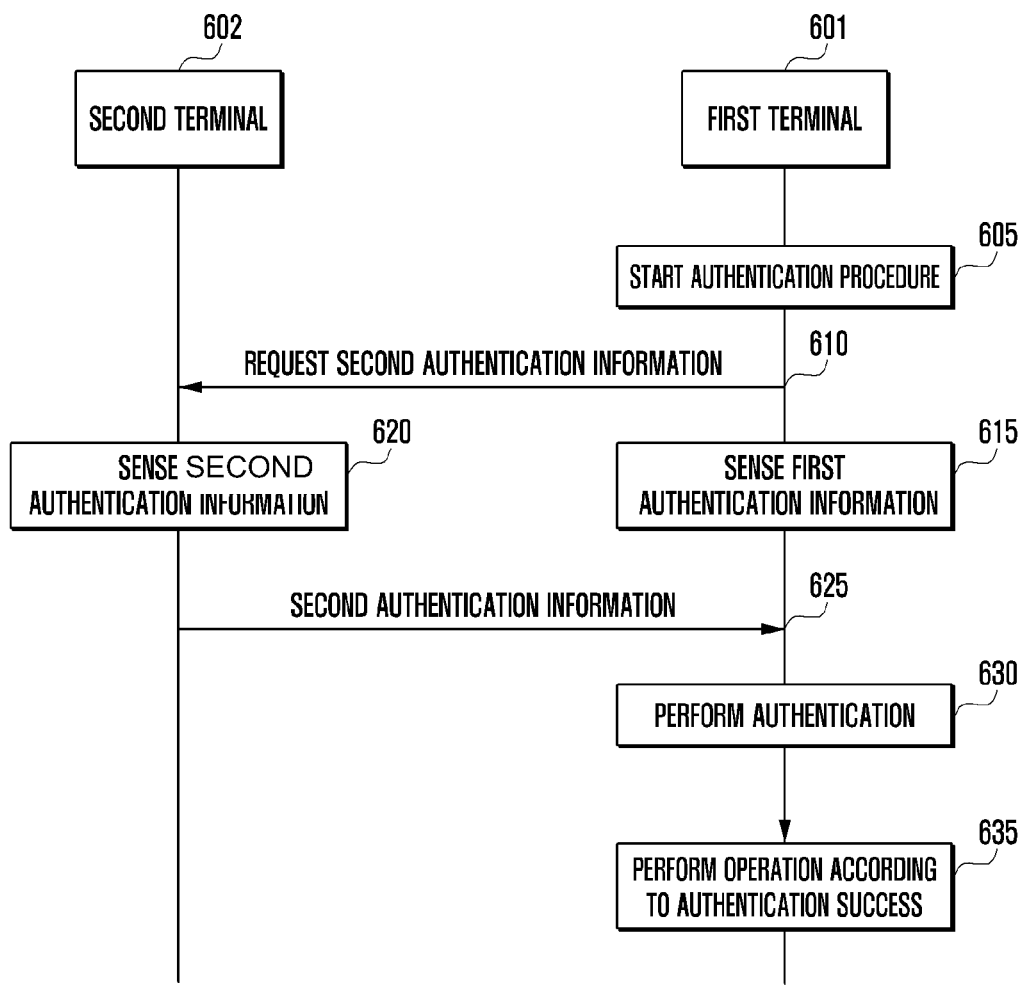
FIG. 6 illustrates an authentication procedure according to a second embodiment of the present disclosure.

FIG. 6 illustrates an authentication procedure according to a second embodiment of the present disclosure.

At operation 605, if an authentication procedure starts by a user's input, a first terminal 601 requests second authentication information from a second terminal 602. At operation 615, the first terminal 601 collects first authentication information. The second terminal 602 collects the second authentication information at operation 620, and transfers the collected second authentication information to the first terminal 601 at operation 625. For example, in the case where the first terminal 601 is a smart phone and the second terminal 602 is a wearable device, a procedure for phone unlocking of the smart phone may start by a user's input (operation 605). In this case, if a user's input enables the smart phone to sense a user's arterial heart rate information or a user's venous pattern information is sensed, the wearable device attached to the back of a user's hand, neck, arm, or leg may transfer the user's arterial heart rate information or the user's venous pattern information sensed for a predetermined time to the smart phone.

The first terminal 601, that has received the second authentication information transferred from the second terminal 602 and has collected the first authentication information, performs authentication based on the first authentication information and the second authentication information at operation 630. For example, as part of the procedure for unlocking a smart phone, the heart rate information or pattern information may be transferred to the smart phone in real time, and in this case, the smart phone may determine whether information sensed by the smart phone and information received from the wearable device are synchronized or have the same peak time.

If the authentication based on the first authentication information and the second authentication information succeeded, the first terminal 601 performs an operation according to the authentication success at operation 635. The operation according to the authentication success may include, for example, unlocking a phone. On the other hand, the operation according to the authentication success may be differently set according to the authentication information. As an example for phone unlocking, in the case where the first authentication information and the second authentication information are biometric information, a basic screen may be displayed according to the authentication success. However, in the case where the first authentication information is a password that is input by a user and the second authentication information is biometric information, an application may be executed and an auto-login may be performed even without a user's input after the basic screen is displayed according to the authentication success.

Figure 7:
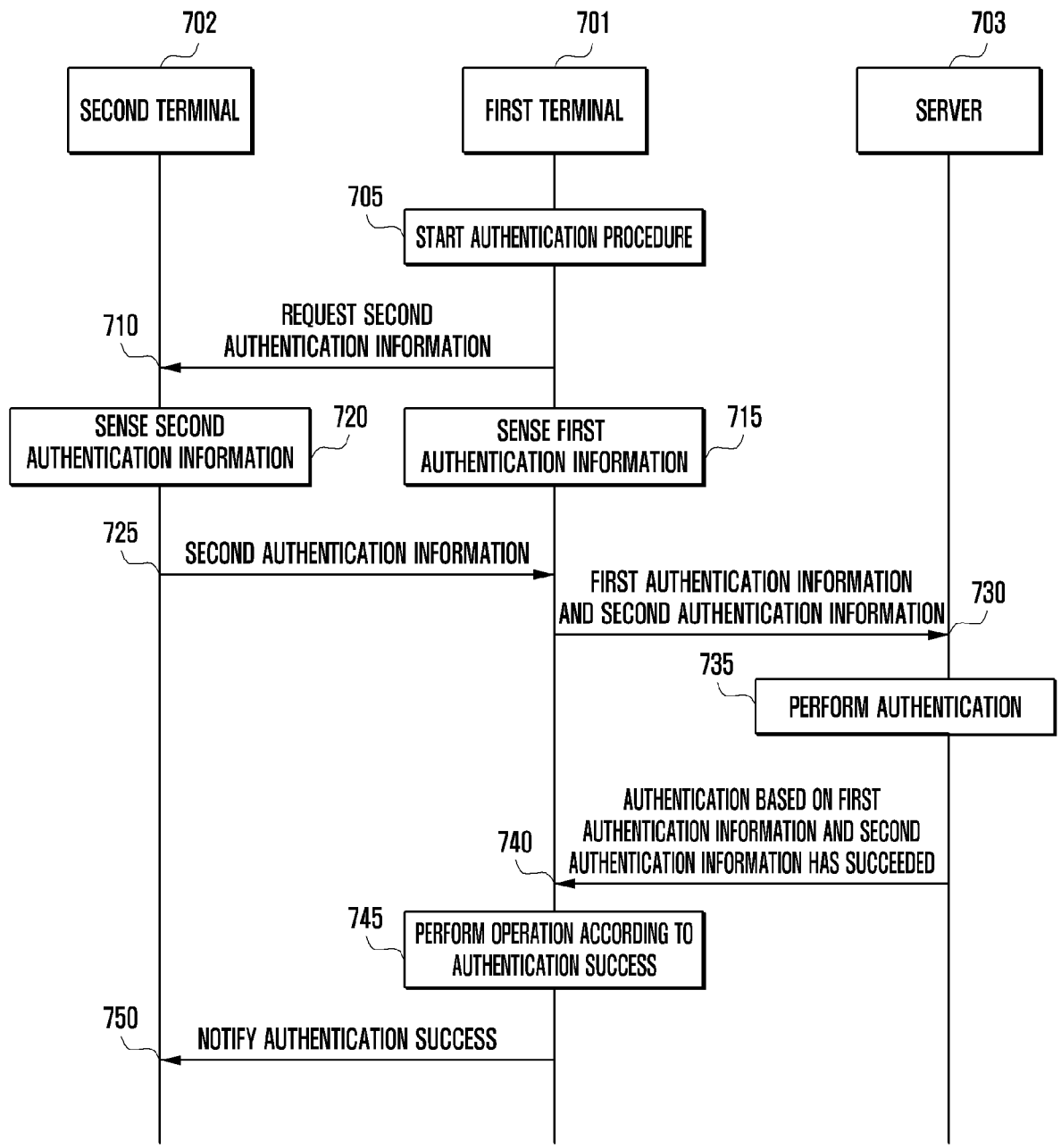
FIG. 7 illustrates an authentication procedure according to a second embodiment of the present disclosure.

FIG. 7 illustrates an authentication procedure according to a second embodiment of the present disclosure.

Unlike FIG. 6, FIG. 7 illustrates that a server 703 rather than a terminal performs authentication. In the case where the server performs the authentication, the burden imposed on a storage space of a terminal can be lightened since the server 703 will store the information required for authentication.

If an authentication procedure starts according to a user's input at operation 705, a first terminal 701 requests second authentication information from a second terminal 702 at operation 710. Further, the first terminal 701 senses first authentication information at operation 715. The second terminal 702 senses the second authentication information at operation 720, and transfers the sensed second authentication information to the first terminal 701 at operation 725.

At operation 730, the first terminal 701, that has received the second authentication information from the second terminal 702 and has sensed the first authentication information by itself, transfers the sensed first authentication information and the received second authentication information to a server 703 at operation 730. At operation 735, the server 703 performs authentication based on the first authentication information and the second authentication information transferred thereto. In the case where the authentication based on the first authentication information and the second authentication information has succeeded, the server 703 notifies the first terminal 701 that the authentication based on the first authentication information and the second authentication information has succeeded at operation 740, and the first terminal 701 performs an operation according to the authentication success at operation 745. In this case, the first terminal 701 may notify the second terminal 702 of the authentication success at operation 750.

On the other hand, according to another embodiment of the present disclosure, in FIG. 7, if a GUI for settlement is displayed to start the authentication procedure at operation 705, the first terminal 701 may request the second authentication information from the second terminal 702 at operation 710. The second terminal 702 may be a wearable device, and may retrieve pre-stored information required for the settlement (e.g., the card number of a credit card) at operation 720 and transfer the information required for the settlement to the first terminal 701 as the second authentication information at operation 725. In this case, the first terminal 701 and the second terminal 702 may be connected to each other through a secured wireless link. The first terminal 701 may receive an input of other information required for the settlement (e.g., password of the credit card) from a user at operation 715, and may transmit the information from the user and the information transferred from the second terminal 702 to the server 703 at operation 730 to request the authentication. Unlike the above-described example, the second terminal 702 may directly transmit the information required for the settlement to the server 703 without passing through the first terminal 701. By using this method, in the case where a user performs settlement (payment) using the first terminal the amount of information to be input can be reduced. In the above-described example, settlement is exemplified, but is not limited thereto. For example, this method can also be applied to information input in case of information browsing using the first terminal.

On the other hand, according to another embodiment of the present disclosure, the second authentication information that the second terminal 702 transfers to the first terminal 701 at operation 725 may correspond to the intensity of a signal that is measured by the second terminal 702 with respect to a specific signal that the first terminal 701 transmits to the second terminal 702. That is, the distance between the first terminal 701 and the second terminal 702 may be calculated on the basis of the measured strength of the signal and whether the calculated distance is equal to or smaller than a predetermined value may both be considered when the authentication is performed.

FIG. 6 illustrates that the first terminal 601 performs the authentication, and FIG. 7 illustrates that the server 703 performs the authentication. According to another embodiment of the present disclosure, unlike FIG. 6 or 7, the terminal and the server may be implemented to perform the authentication, respectively, and to perform an operation according to the authentication success only in the case where both the authentication in the terminal and the authentication in the server succeed. In this case, the authentication information used for the authentication in the terminal and the authentication information used for the authentication in the server may be the same or may be different from each other. Up to now, the authentication procedure according to the first and second embodiments has been described. The authentication procedure is not limited to any one of the above-described embodiments, and a new embodiment that includes a part of the features described in the first embodiment or the second embodiment may be implemented.

Figure 8:
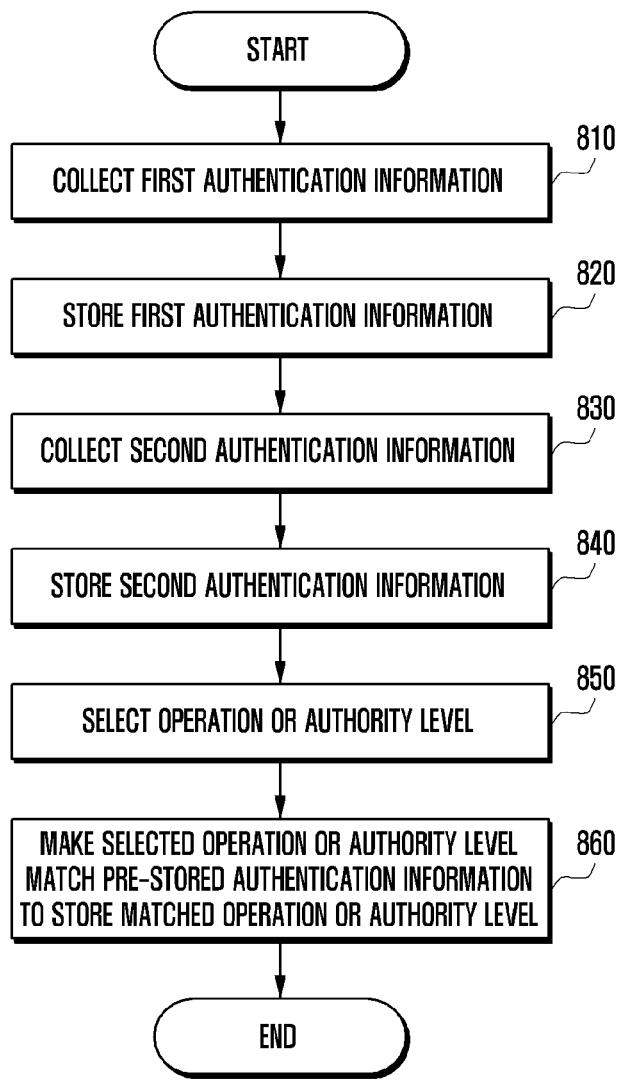
FIG. 8 illustrates an operation of a terminal according to a third embodiment of the present disclosure.

FIG. 8 illustrates an operation of a terminal according to a third embodiment of the present disclosure.

A terminal or a server may store information required to perform authentication, and a user may set the information through a graphic user interface (GUI) of the terminal. If a program or an application for setting the information required to perform the authentication is launched, the first terminal collects the first authentication information at operation 810. At operation 820, the terminal may store the collected first authentication information and/or may transmit the collected first authentication information to a server. In the case where the first authentication information is transmitted to the server, the server that has received the first authentication information stores the first authentication information. After the first authentication information is stored, the first terminal or the second terminal collects second authentication information at operation 830. In the case where the second terminal collects the second authentication information, the second terminal may transfer the collected second authentication information to the first terminal or the server. In the same manner as the first authentication information, the first terminal and/or the server stores the second authentication information at operation 840. The first authentication information and the second authentication information may be matched together before stored.

The first authentication information and the second authentication information may include at least one of biometric information that can be sensed by the first terminal or the second terminal, context information, and user input information. The collection of the first authentication information may be sensing a password input. The collection of the second authentication information may correspond to, for example, a case where the second terminal senses a user's heart rate pattern for a predetermined time starting from a point when the user requests the sensing.

In the above-described example, only the first authentication information and the second authentication information have been described. However, the authentication information is not limited thereto. For example, if it is intended to further set additional authentication information (e.g., third authentication information and fourth authentication information) that can be input by a user in the case where the authentication has failed, the authentication procedure may further include collecting and storing the additional authentication information.

At operation 850, the first terminal senses an operation that is performed in the case where the authentication based on the stored first authentication information and the authentication based on the second authentication information have succeeded and selects an authority level. For example, the operation may correspond to settlement or an account transfer. The authority level may correspond to, for example, a range of information that a user can read through the first terminal. At operation 860, the first terminal may make the selected operation or the authority level match the pre-stored authentication information, and may store the operation or the authority level or transmit the operation or the authority level to the server. In the case where the server receives the operation or the authority level, the server makes the received operation or the authority level match the pre-stored authentication information to store the matched operation or authority level.

FIG. 8 illustrates that the authority level is selected after the authentication information is collected and stored. However, it is also possible to select the authority level prior to the collection and storage of the authentication information.

Although not illustrated in FIG. 8, in the case of storing two or more pieces of authentication information, the authentication procedure may further include changing the order of the pieces of authentication information. In this case, the order may be automatically changed so that the authentication information having a high average authentication success rate is collected first or later.

Figure 9:
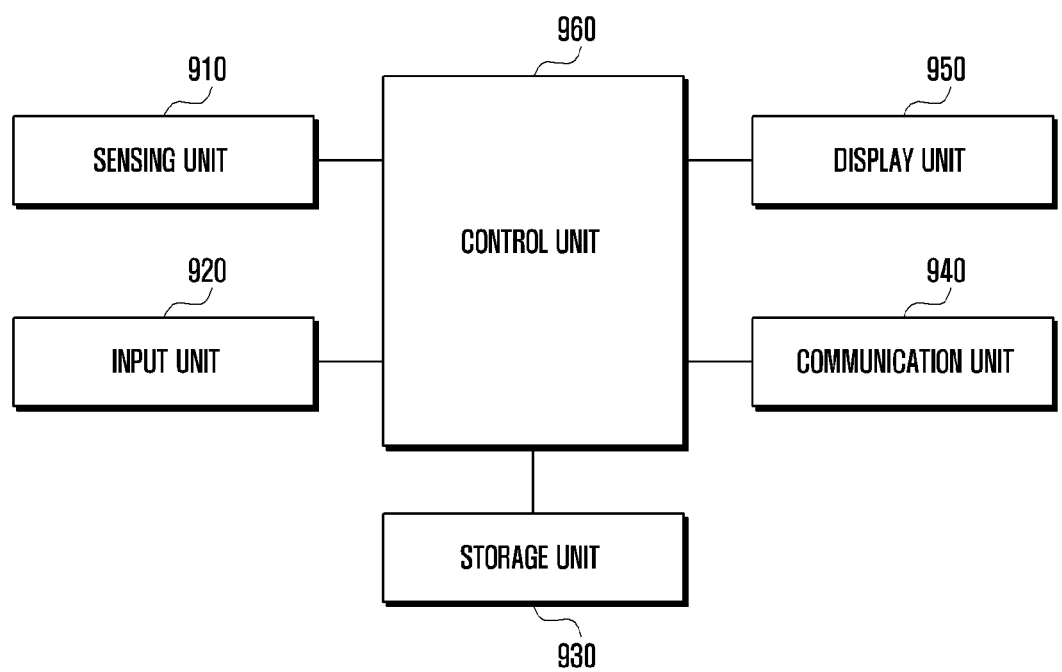
FIG. 9 illustrates the configuration of a terminal according to an embodiment of the present disclosure.

FIG. 9 illustrates the configuration of a terminal according to an embodiment of the present disclosure.

Referring to FIG. 9, a terminal may include a sensing unit 910, an input unit 920, a storage unit 930, a communication unit 940, a display unit 950, and a control unit 960.

The sensing unit 910 may include one or more sensors to collect a user's authentication information (e.g., biometric information or context information). For example, the sensing unit 910 may include a geomagnetic sensor, a temperature sensor, an air pressure sensor, a proximity sensor, an illumination sensor, a GPS, an acceleration sensor, an angular speed sensor, a speed sensor, a gravity sensor, a tilt sensor, a gyro sensor, a gas sensor, a timer, a biometric sensor, a camera, and/or a microphone. In the case where the terminal includes a front camera and a rear camera, the front camera may collect a user's facial information or behavior information, and the rear camera may collect a surrounding image of the terminal. The microphone may collect surrounding sounds and a user's voice, and the GPS may collect location information from a biometric authenticator.

The input unit 920 transfers signals that are input in relation to authentication function control of the terminal and setting of various kinds of authentication functions to the control unit 960. Further, the input unit 920 may be formed of a touch screen or a general keypad. Further, the input unit 920 may include function keys and soft keys. According to embodiments, the input unit 920 may be included in the sensing unit 910.

The storage unit 930 may store authentication information collected by the terminal, biometric information, or information required to perform authentication. The communication unit 940 may communicate with another terminal or a server. The display unit 950 may display information, such as the information required for authentication, authentication information input requests, authentication successes, or authentication failures.

The control unit 960 controls the whole state and operation of constituent elements that constitute the terminal (not limited to the sensing unit 910, input unit 920, storage unit 930, communication unit 940 and display unit 950). The control unit 960 may perform authentication based on first authentication information and second authentication information, and may control the sensing unit 910 to collect third authentication information if it is determined that the authentication based on the first authentication information has succeeded and the authentication based on the second authentication information has failed. In this case, the third authentication information may correspond to information that is reserved to provide for failure of the authentication based on the second authentication information. The control unit 960 may perform a control operation so that the sensing unit 910 senses the first authentication information, the communication unit 940 requests the second authentication information from the second terminal and the communication unit 940 receives the second authentication information that is sensed by the second terminal from the second terminal. Here, the second authentication information may include biometric information or context information that is sensed by the second terminal, and the third authentication information may include information that is input by a user of the first terminal. If it is determined that the authentication based on the third authentication information has succeeded, the control unit 960 may control the display unit 950 to display that the authentication has successfully been performed. If it is determined that both the authentication based on the first authentication information and the authentication based on the second authentication information have succeeded, the control unit 960 may control the display unit 950 to display that the authentication has successfully been performed. The control unit 960 may perform a control operation so that the communication unit 940 transmits the first authentication information and the second authentication information to the authentication server, and receives the result of the authentication based on the first authentication information and the second authentication information from the authentication server.

In FIG. 9, the sensing unit 910, the input unit 920, the storage unit 930, the communication unit 940, the display unit 950, and the control unit 960 are illustrated as separate blocks that perform different functions. However, this is merely for convenience for the description, and it may not be necessary to divide the respective functions as described above.

What is claimed is:

1. A method for performing an authentication by a first terminal, the method comprising:
    obtaining main authentication information requiring a user's cooperation, based on an initial condition for obtaining the main authentication information being triggered;
    performing a first authentication based on the main authentication information;
    requesting, to a second terminal, first auxiliary authentication information not requiring the user's cooperation, based on the first authentication being successful;
    receiving, from the second terminal, the first auxiliary authentication information;
    performing a second authentication based on the first auxiliary authentication information, wherein performing the second authentication comprises:
        determining a distance between the first terminal and the second terminal, the distance being identified based on a strength of a signal including the first auxiliary authentication information;
        determining, in case that the main authentication information and the first auxiliary authentication information are information of same type, whether a degree of overlap between the main authentication information and the first auxiliary authentication information is higher than a first reference value;
        determining, in case that the main authentication information and the first auxiliary authentication information are not information of same type, whether a degree of relevance between the main authentication information and the first auxiliary authentication information is higher than a second reference value; and
        determining that the second authentication is failed, in case that the distance is greater than a threshold, the degree of overlap is lower than the first reference value, or the degree of relevance is lower than the second reference value;
    determining that a third authentication is required by identifying that an error range that occurred in a result of the second authentication is within a threshold range, based on the second authentication having failed;
    obtaining second auxiliary authentication information requiring the user's cooperation, based on the determination;
    performing a third authentication based on the second auxiliary authentication information; and
    performing an operation according to an authentication based on the third authentication being successful, by obtaining an authority level selected by the user and storing the authority level matched with the second auxiliary authentication information,
    wherein the operation according to the success of the authentication is set according to the main authentication information, the first auxiliary authentication information and the second auxiliary authentication information,
    wherein the main authentication information and the second auxiliary authentication information include at least one of the user's signature information, password information, and biometric information requiring the user's cooperation, and
    wherein the first auxiliary authentication information includes at least one of context information and biometric information not requiring the user's cooperation.

2. The method of claim 1, wherein the second auxiliary authentication information is reserved to provide for failure of the second authentication.

3. The method of claim 1, wherein performing the first authentication comprises:
    transmitting the main authentication information to an authentication server; and
    receiving a result of the first authentication based on the main authentication information from the authentication server.

4. A first terminal that performs an authentication, the first terminal comprising:
    a sensor configured to obtain authentication information; and
    a controller configured to:
    obtain main authentication information requiring a user's cooperation, based on an initial condition for obtaining the main authentication information being triggered,
    perform a first authentication based on the main authentication information,
    request, to a second terminal, first auxiliary authentication information not requiring the user's cooperation, based on the first authentication being successful, receive, from the second terminal, the first auxiliary authentication information, perform a second authentication based on the first auxiliary authentication information, wherein the controller is further configured to perform the second authentication by:

determining a distance between the first terminal and the second terminal, the distance being identified based on a strength of a signal including the first auxiliary authentication information, determining, in case that the main authentication information and the first auxiliary authentication information are information of same type, whether a degree of overlap between the main authentication information and the first auxiliary authentication information is higher than a first reference value, determining, in case that the main authentication information and the first auxiliary authentication information are not information of same type, whether a degree of relevance between the main authentication information and the first auxiliary authentication information is higher than a second reference value, and determining that the second authentication is failed, in case that the distance is greater than a threshold, the degree of overlap is lower than the first reference value, or the degree of relevance is lower than the second reference value, determine that a third authentication is required by identifying that an error range that occurred in a result of the second authentication is within a threshold range, based on the second authentication having failed, obtain second auxiliary information requiring the user's cooperation, based on the determination, perform a third authentication based on the second auxiliary authentication information, and perform an operation according to an authentication based on the third authentication being successful, by obtaining an authority level selected by the user and storing the authority level matched with the second auxiliary authentication information, wherein the operation according to the success of the authentication is set according to the main authentication information, the first auxiliary authentication information and the second auxiliary authentication information, wherein the main authentication information and the second auxiliary authentication information include at least one of the user's signature information, password information, and biometric information requiring the user's cooperation, and wherein the first auxiliary authentication information includes at least one of context information and biometric information not requiring the user's cooperation.

5. The first terminal of claim 4, wherein the second auxiliary authentication information is reserved to provide for failure of the second authentication.

6. The first terminal of claim 4, further comprising a transceiver configured to transmit and receive information to and from an authentication server, wherein the controller is further configured to:

control the transceiver to transmit the main authentication information to an authentication server, and control the transceiver to receive a result of the first authentication based on the main authentication information from the authentication server.

* * * * *